Aug. 17, 1948.　　　F. S. MILLER　　　2,447,200
EXHAUST NOZZLE FOR ROCKET MOTORS
Filed Sept. 3, 1943
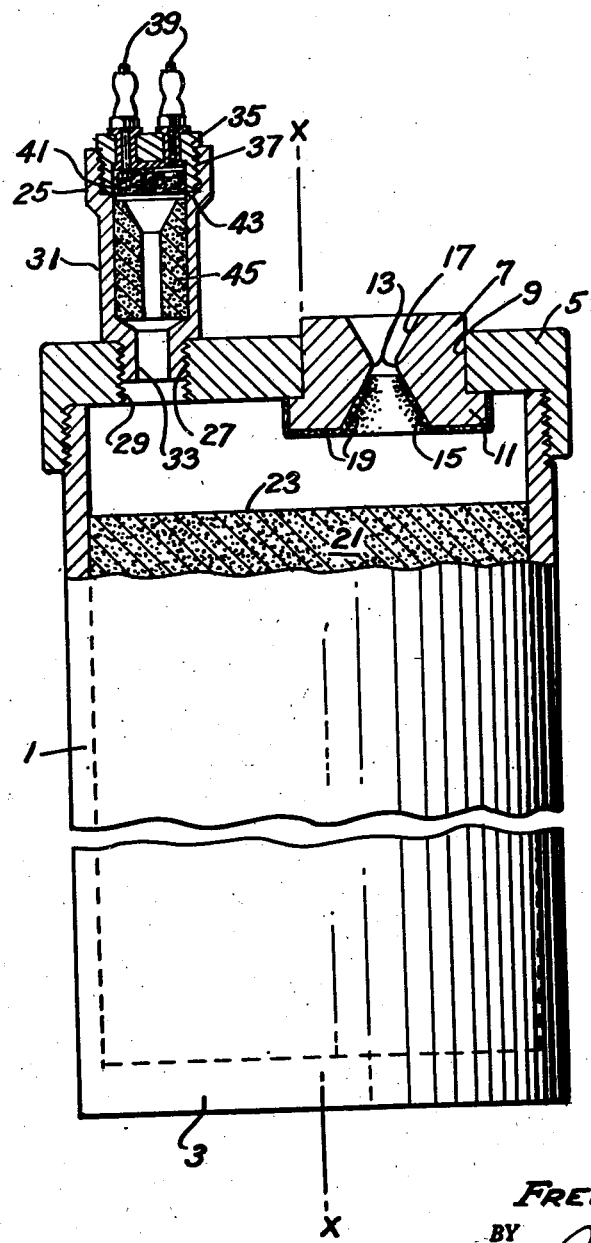
INVENTOR.
FRED S. MILLER
BY
AGENT.

Patented Aug. 17, 1948

2,447,200

UNITED STATES PATENT OFFICE 2,447,200

EXHAUST NOZZLE FOR ROCKET MOTORS

Fred S. Miller, Pasadena, Calif., assignor to Aerojet Engineering Corporation, Azusa, Calif., a corporation of Delaware Application September 3, 1943, Serial No. 501,154

2 Claims. (Cl. 60—35.6)

My invention pertains to rocket motors and more particularly to means for increasing the operating time of rocket motors.

In general a rocket motor comprises a combustion chamber, a nozzle in the wall of the combustion chamber, and means for generating within the combustion chamber gas, or vapors, at high temperature and high pressure. In its most practical form the nozzle is of the De Laval type. Such a nozzle has a restricted throat providing communication between the combustion chamber and the medium surrounding the rocket motor, and smooth conical passages converging toward the throat on each side thereof.

As the gas escapes through the nozzle a mechanical reaction is produced on the rocket motor. The resulting thrust may be utilized to propel the rocket motor itself or to propel or direct a vehicle to which it is attached. In general the effectiveness of a rocket motor increases with the period of operation.

During the operation of the motor heat is transferred from the vapors to the wall of the combustion chamber and to the wall of the nozzle. Apparently, heat is transferred more rapidly to the wall of the nozzle than to the wall of the combustion chamber, the rate of heat transfer being a maximum at the nozzle throat. In any case, the nozzle tends to heat more rapidly and to a higher temperature than does the wall of the combustion chamber.

Generally the temperature of the gases exceeds the melting point of the material forming the walls of the combustion chamber and the nozzle. For this reason the duration that a rocket motor can operate is limited by the heating characteristics of the nozzle. For example, if the melting point of the material composing the nozzle should be exceeded at the throat, the nozzle may melt there and the cross-sectional area of the throat may be increased in an irregular manner, thereby causing irregularities in the amount of thrust generated. In any event, the nozzle itself may be injured and rendered unfit for subsequent use in a rocket motor.

Accordingly the principal object of my invention is to provide means for increasing the period of operation of a rocket motor.

Another object of my invention is to provide means for preserving the nozzle of a rocket motor.

To achieve these objects I coat the shoulder and the wall of the conical passage leading to the nozzle throat from the combustion chamber with an organic thermoplastic material which will reduce the rate of flow of heat from the escaping gases to the wall of the nozzle. For such a coating I prefer to utilize a material which is chemically inert in the presence of such heated vapors. Preferably, the material forming the coating should be volatilizable and should have a low heat conductivity. I have found that asphalt compositions are very satisfactory for my purpose as they possess all three desirable properties, namely thermoplasticity, volatilizibility, and low heat conductivity.

As the coating vaporizes, it absorbs heat and thus reduces the effective rate of heat transfer to the nozzle. I prefer to utilize a thermoplastic coating because such a coating has little tendency to crack or separate from the wall of the nozzle as it is heated. Such a coating has the further advantage that, as it softens in the presence of the heated vapors, it tends to flow toward the nozzle throat and thus partially insulate the nozzle at the throat itself.

It is to be understood that though my invention as described herein is applied to rocket motors utilizing solid propellants, it may also be applied to other kinds of rocket motors in which gases, or vapors, are generated at high temperature and pressure, and that though my invention is illustrated with reference to a coating composed of asphalt, coatings of other materials may also be used without departing from the principles of my invention as set forth herein and defined in the appended claims.

My invention may be more readily understood by reference to the following description taken in conjunction with the accompanying drawing, partly in section, illustrating the application of my invention to a rocket motor utilizing a solid propellant charge.

For convenience the rocket motor shown in the drawing will be described as if standing with its axis X—X vertical. As shown the rocket motor has a combustion chamber formed by a cylindrical steel vessel 1 closed at the lower end by an end plate 3 and a cap 5 attached to the upper end by means of suitable threads.

A copper nozzle 7 extends through a bore 9 in the wall of the cap and is held in place by means of a press fit. The nozzle is prevented from slipping through said bore by means of a nozzle shoulder 11 seated against the wall of said cap within the combustion chamber.

A passage through the nozzle provides communication between the combustion chamber and the surrounding medium. Said passage has a restricted throat 13 intermediate the ends thereof and communicates with the combustion chamber and the external medium by means of two smooth conical portions 15 and 17 respectively each of which converges toward the throat.

In the embodiment of my invention here illustrated, a coating 19 composed of asphalt covers the wall of the conical passage 15 communicating directly with the combustion chamber, and the exposed portion of the shoulder 11 within the combustion chamber.

The particular rocket motor shown utilizes a solid propellant charge 21 filling the lower portion of the combustion chamber. Such a propellant charge may be composed of a fuel and oxidizer, for example, asphalt and potassium perchlorate, which when once ignited at the upper free surface 23 thereof is adapted to burn over an extended period of time liberating vapors at high temperature and pressure.

Suitable means for igniting the propellant charge are provided. In the form shown such means comprise an ignition squib 25 which is mounted externally to the combustion chamber and is secured to the wall thereof by means of threads 27 in a second bore 29 extending through the cap wall. This ignition squib comprises a tubular member 31 having an elongated hollow cylindrical portion therein communicating with the space within the combustion chamber through a smaller cylindrical passage 33 at the lower end of the squib. The upper portion of the tubular member is closed by means of a cup-shaped plug 35 secured thereto by means of threads 37. A pair of insulated electrical connectors 39, 39 extend through the upper end of said plug.

A short piece of Nichrome wire 41 is connected to said connectors. Within the cup-shaped portion of said plug said piece of wire is embedded within a small charge 43 of ignition powder cemented within said cup-shaped portion.

The elongated cylindrical portion 31 of the squib includes a cylindrical pellet 45 composed of combustible material. This pellet has an axial channel extending therethrough along the axis of said cylindrical portion 31.

In order to initiate operation of the rocket motor, electrical current is supplied through the connectors 39, 39 to the piece of Nichrome wire from some suitable source of electrical energy (not shown). When the temperature of the ignition charge 43 reaches the ignition point, said charge ignites and in turn ignites the combustible pellet 45. As the pellet burns it projects hot gas, usually in the form of a flame, onto the upper free surface 23 of the propellant charge.

After a short interval of time, of the order of one second, part of the propellant charge itself reaches its ignition temperature, causing the fuel and oxidizer to react chemically and thereby liberate combustion gases at high temperature and pressure. Such temperatures may be of the order of 3000° C. Preferably the propellant charge contains an excess of asphalt so that substantially all of the potassium perchlorate is consumed in the combustion process and an atmosphere of heated combustion gases is produced within the combustion chamber, in which the material, in this case asphalt, composing the coating on the nozzle is chemically inert.

As the gases escape through the nozzle they react mechanically on the motor, generating a thrust which may be utilized to assist in the propulsion of a vehicle such as an airplane, to which the motor is attached by suitable means (not shown). After passing through the throat of the nozzle into the surrounding medium the combustion products expand and cool. During the operation of the motor, heat is transferred from the vapors to various parts of the walls of the chamber and the nozzle in an amount varying directly as a function of the rate of flow and the temperature of the vapors in contact therewith.

The rate at which heat may be transferred to the nozzle itself is reduced considerably by virtue of the low heat conductivity of the asphalt coating. As the temperature of the coating rises the asphalt forming the coating vaporizes, thus absorbing heat and tending to cool the wall of the nozzle. During the operation of the motor the coating vaporizes most rapidly near the nozzle throat and the portion of the coating on the wall of the conical portion of the passage within the combustion chamber is softened and forced toward the throat by the gases flowing through the nozzle. Preferably little or no asphalt coats the throat itself as at low temperatures such a coating may break off during the initial period of operation.

By virtue of the fact that the wall of the nozzle passage is temporarily insulated by the asphalt coating and is partially cooled by virtue of the vaporization of the asphalt coating during the initial stage of motor operation, the nozzle may be operated for a considerably longer time than otherwise before reaching the upper safe temperature limit of operation.

From the foregoing description it can be readily seen that I have provided means for increasing the operating time of rocket motors and for preserving the life of a nozzle used in a rocket motor.

I claim:

1. In combination with a rocket motor having a combustion chamber, a propellant charge within the chamber adapted to burn over an extended period of time, a metallic nozzle in the wall of said motor and having a passage extending therethrough, the passage wall having a restricted throat therein and a smooth portion within the chamber converging toward said throat, and an asphalt coating on the wall of said portion.

2. In combination with a rocket motor having a combustion chamber, a propellant charge within the chamber adapted to burn over an extended period of time, a metallic nozzle having a shoulder therein seated against the interior wall of the rocket motor chamber, said nozzle having a restricted throat therein providing a communication between motor chamber and the surrounding medium and a smooth conical passage extending from the shoulder to the throat, and an asphalt coating on the walls of the conical passage and on the exposed portion of said shoulder.

FRED S. MILLER.

REFERENCES CITED

The following references are of record in the file of this patent:

UNITED STATES PATENTS

| Number | Name | Date |
| --- | --- | --- |
| 776,518 | Junggren | Dec. 6, 1904 |
| 1,003,411 | Bales | Sept. 19, 1911 |
| 1,102,653 | Goddard | July 7, 1914 |
| 1,481,872 | Miller | Jan. 29, 1924 |
| 2,206,057 | Skinner | July 2, 1940 |